United States Patent [19]

McCormick

[11] 4,271,668

[45] Jun. 9, 1981

[54] COUNTER-ROTATING WAVE ENERGY CONVERSION TURBINE

[76] Inventor: Michael E. McCormick, 1906 Sands Dr., Annapolis, Md. 21401

[21] Appl. No.: 86,010

[22] Filed: Oct. 17, 1979

[51] Int. Cl.³ .......................................... F03B 13/12
[52] U.S. Cl. ...................................... 60/398; 60/497; 415/152 A
[58] Field of Search ............... 60/497, 398, 407, 502, 60/409, 412; 417/100, 330; 290/53; 415/152 A

[56] References Cited

U.S. PATENT DOCUMENTS

| | | | |
|---|---|---|---|
| 2,484,183 | 10/1949 | Paulson | 60/398 X |
| 3,912,938 | 10/1975 | Filipenco | 290/53 |
| 3,925,986 | 12/1975 | Barwick | 60/398 |

Primary Examiner—Allen M. Ostrager

[57] ABSTRACT

A counter-rotating turbine for converting energy from waves. A turbine is positioned in a pneumatic-type wave energy converter and converts the energy of alternating air flow above the internal water surface into mechanical energy. The turbine has counter-rotating runners and guide vanes located both upstream and downstream, and the alternating air flow in the energy converter excites the turbine runners after being turned by the guide vanes.

7 Claims, 3 Drawing Figures

COUNTER-ROTATING WAVE ENERGY CONVERSION TURBINE

BACKGROUND OF THE INVENTION

The present invention relates to a device for utilizing the power generated by ocean waves, and more particularly relates to a turbine having counter-rotating runners which drive an output shaft which can be used for driving an electrical generator.

Various heretofore known devices utilize the rise and fall of the tide or utilize wave action to impart motion to mechanical systems. For example, in U.S. Pat. No. 3,912,938, entitled "Electrical Stations Operated By Waves", which issued Oct. 14, 1975, to Gregory D. Filipenco, there is described a device for transforming kinetic energy of waves into mechanical energy which actuates electrical generators.

In U.S. Pat. No. 4,152,895, entitled, "Wave Powered Motion", which issued May 8, 1979, to Leslie S. Wirt, there is shown a refractive horn for smoothing waves which are then transformed to mechanical rotation. The rotational kinetic energy is extracted by means of a turbine to provide useful work.

Another wave energy converter is described in U.S. Pat. No. 4,078,382, entitled, "Method And Apparatus For Deriving Useful Energy From Sea Waves", which issued Mar. 14, 1978, to Romulo M. Ricafranca et al. Converging dams are provided to funnel water into a pressure chamber and a turbine rotor is disposed on a vertical axis above the pressure chamber. Arcuate zigzag turbine blades are provided which result in a double action mode of continuous rotation as the wave surges pass up through and back down through a rotor.

In U.S. Pat. No. 3,925,986, entitled "Air Engine", which issued Dec. 16, 1975, to William M. Barwick, there is described a device for utilizing the power gneerated by the rise and fall of ocean tides. A tidal chamber is provided wherein the rise of the tide creates pressure which is transported to actuate a usable power device. As the tide falls, a partial vacuum is created within the tidal chamber and a value mechanism is operated so that the partial vacuum can be used to drive a turbine.

SUMMARY OF THE INVENTION

The present invention realtes to a wave energy converter using a counter-rotating axial flow turbine. A pneumatic-type wave converter is used wherein a chamber is provided and water rises and falls within the chamber to force air through a relatively small opening. Extending from the small opening is a flow passage which contains a turbine for converting the flow energy into mechanical energy. Flowing air is allowed to alternately empty into the atmosphere when the internal water surface is rising and drawn into the chamber from the atmosphere when the internal water surface is falling. The turbine has counter-rotating runners and guide vanes located both upstream and downstream of the runners. Alternating air flow within the passage excites the turbine runners after being turned by the guide vanes. The runners turn an output shaft through gears.

It is therefore a general object of the present invention to provide an improved converter for converting wave energy to mechanical energy.

Another object of the present invention is to provide a turbine for converting energy of alternating air flow into mechanical energy.

Still another object of the present invention is to provide a counter-rotating axial flow turbine for converting ocean wave energy into useful energy.

Other objects, advantages and novel features of the present invention will become apparent from the following detailed description when considered in conjunction with the accompanying drawings.

DESCRIPTION OF THE PREFERRED EMBODIMENT

Figure 1:
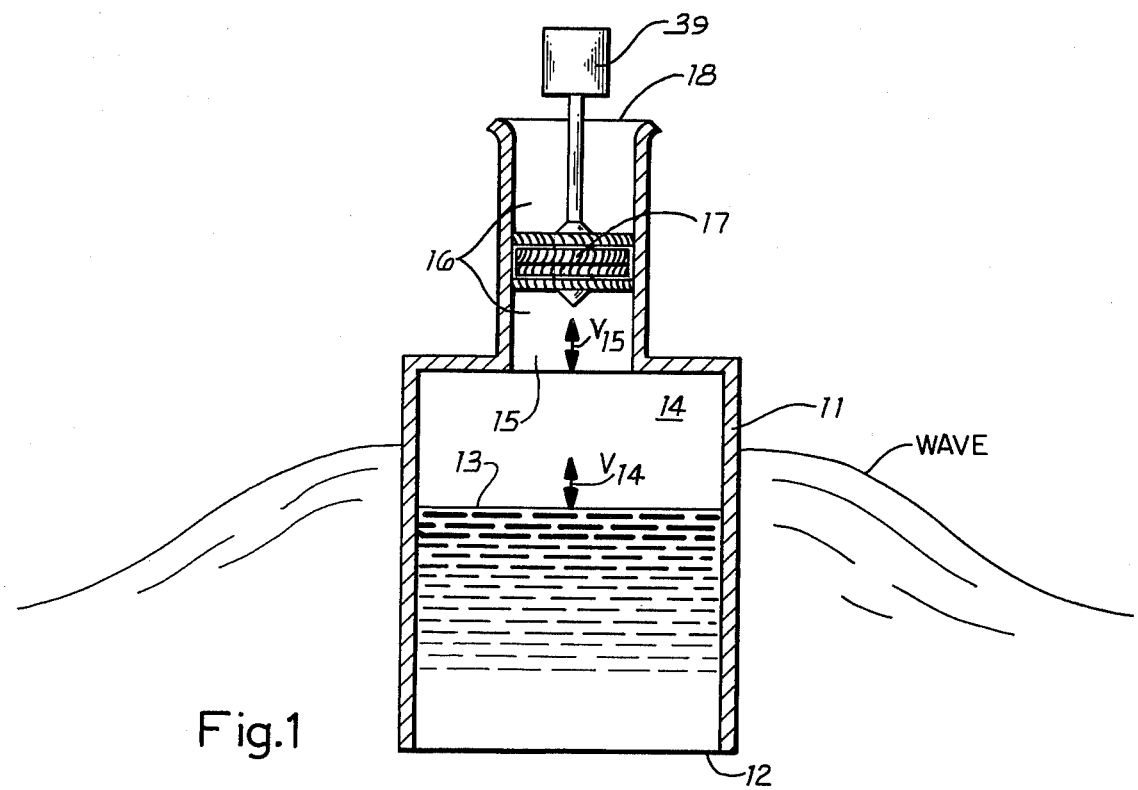
FIG. 1 is a diagrammatic cross section of a preferred embodiment of the present invention.

Referring now to FIG. 1 of the drawings, there is shown a pneumatic chamber 11 having an opening 12 on its submerged underside. Water, which is excited by a traveling or standing water wave, rises and falls within chamber 11. The internal water surface 13 forces air 14 above the water surface 13 through a relatively small opening 15 and, due to the conservation of mass, the air speed $V_{15}$ is greater than the air speed $V_{14}$ just above water surface 13. The relationship between the velocities is:

$$V_{15} = V_{14}(A_{14}/A_{15}); \quad (1)$$

where $A_{14}$ is the cross-sectional area of the chamber which is normal to the flow speed $V_{14}$, and $A_{15}$ is the cross-sectional area of opening 15 which is normal to the flow speed $V_{15}$.

A flow passage 16 extends from opening 15 and contains a counter-rotating turbine 17 for converting flow energy to mechanical energy. Air flowing within passage 16 empties into the atmosphere through opening 18 when water surface 13 is rising and air is drawn into chamber 11 from the atmosphere when water surface 13 is falling.

Figure 2:
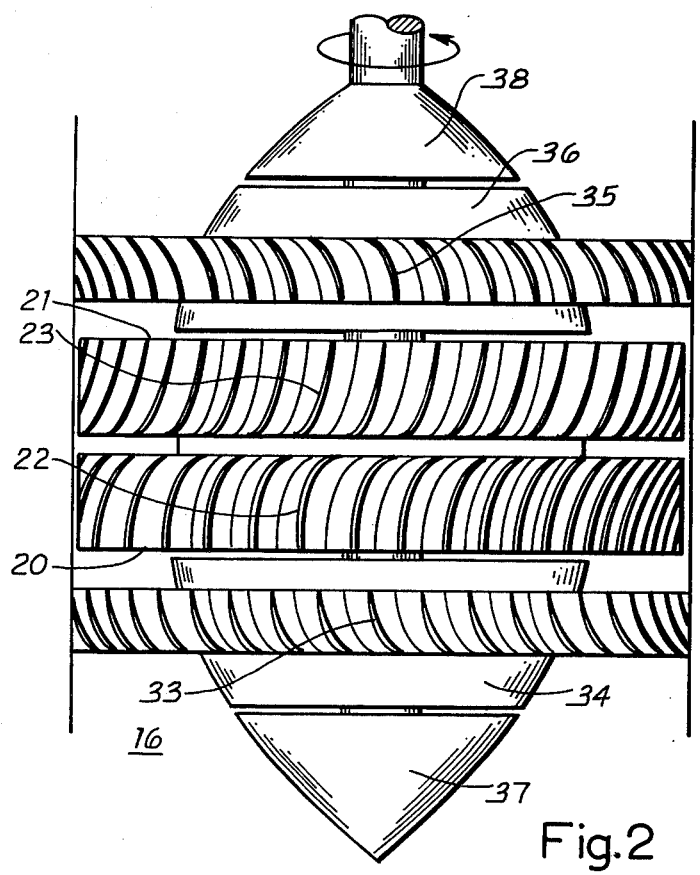
FIG. 2 is a side view of a counter-rotating axial flow turbine.
Figure 3:
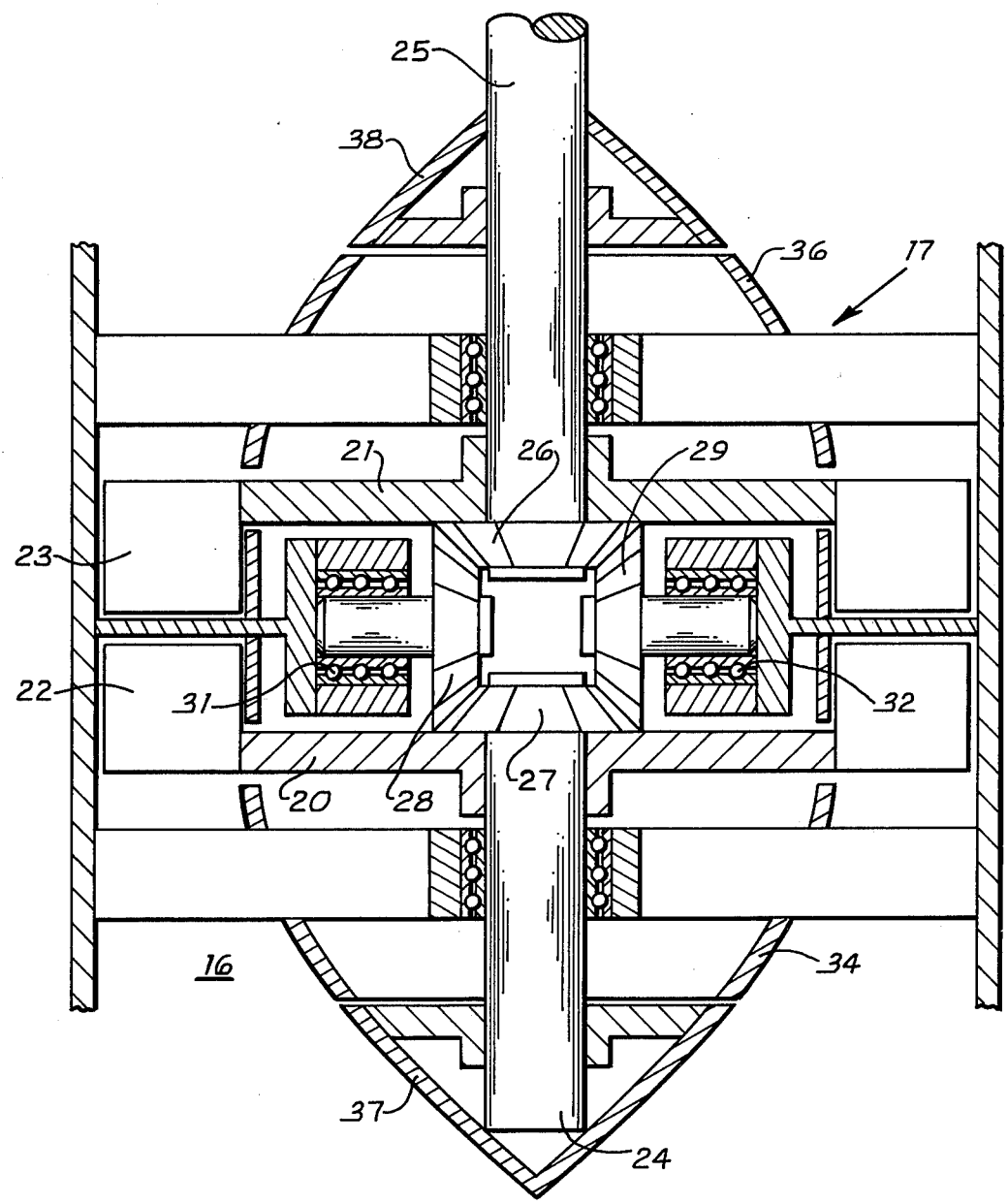
FIG. 3 is a sectional view of the turbine shown in FIG. 2 of the drawings.

Referring now to FIGS. 2 and 3 of the drawings, there is shown a counter-rotating turbine 17 that is positioned within passage 16 and is rotated when air passes through passage 16 in either direction. A pair of runners 20 and 21, each having a plurality of blades 22 and 23, respectively, are supported on shafts 24 and 25, respectively, and, viewed from the end of output shaft 25, runner 21 is rotated in a counter-clockwise direction and runner 20 is rotated in a clockwise direction. As best shown in FIGS. 1 and 2 of the drawings, blades 22 are contoured so that flow of air upwardly through opening 15 will rotate blades 22 and, likewise, blades 23 are contoured so that flow of air downwardly through opening 18 will rotate blades 23. A bevel gear 26 is attached with output shaft 25 and a similar bevel gear 27 is attached with shaft 24. A pair of idler gears 28 and 29 are rotatably supported in bearings 31 and 32, respectively, and gears 28 and 29 mesh with gears 26 and 27 so that shafts 24 and 25 are rotated at the same speed but in opposite directions.

A plurality of fixed guide vanes 33 are provided on bottom fairing 34 and are contoured such that air flowing upwardly through opening 15 will be turned in a direction so as to strike blades 22 at a more optimum angle. Likewise, a plurality of fixed guide vanes 35 are provided on top fairing 36 and are contoured such that air flowing downwardly through opening 18 will be turned in a direction so as to strike blades 23 at a more optimum angle. Conical-shaped hubs 37 and 38 are provided on the lower and upper ends, respectively, of turbine 17 to provide flow streamlining and hubs 37 and 38 may be either fixed or rotatable at the same speed as runners 20 and 21.

OPERATION

In operation, chamber 11 is positioned in an ocean environment and is mounted or anchored so that it assumes a position as shown in FIG. 1 of the drawings. By way of example, chamber 11 could be part of a ship-shaped floating platform that might contain a plurality of chambers 11. Water which is excited by a traveling or standing water wave rises and falls with chamber 11. When water rises inside chamber 11, air 14 is forced upwardly and passes through passage 16 to rotate runner 22 which, in turn, rotates gear 27 and idler gears 28 and 29 which drive shaft 25, which is connected with a generator 39. Flowing air within passage 16 empties into the atmosphere through opening 18 when water surface 13 is rising. When a wave reaches a crest, water within chamber 11 begins to fall thereby creating a partial vacuum which draws in air through opening 18 and this flow of air rotates runner 21 which, in turn, rotates gear 26 and drives shaft 25.

It can thus be seen that drive shaft 25 is rotated by counter-rotating blades which are alternately driven by air passing through passage 16.

Obviously many modifications and variations of the present invention are possible in the light of the above teachings. It is therefore to be understood that the invention may be practiced otherwise than as specifically described.

I claim:

1. An apparatus for converting ocean wave motion into useful energy comprising,
    a pressure chamber forming a pneumatic chamber above the ocean water whereby a standing wave is maintained within the pressure chamber and transformed to a surging wave by normal wave motion thereby causing cyclic compression and suction of the air within the pressure chamber above the standing wave,
    a counter-rotating turbine transforming pneumatic suction and compression pressure of the air resulting from the wave surge into mechanical energy, said turbine comprising an output shaft mounted for rotation about a vertical axis within said pressure chamber, first and second rows of stationarily mounted guide vanes, a pair of counter-rotating runners connected with said output shaft and positioned between said first and second rows of stationarily mounted guide vanes, each runner having a plurality of arcuate turbine blades arranged so as to be rotated by moving air within said pressure chamber, and
    an aperture in said pressure chamber above said counter-rotating turbine for permitting air flow to and from said counter-rotating turbine.

2. An apparatus for converting ocean wave motion into useful energy as set forth in claim 1 wherein said first runner is mounted on said output shaft and said second runner is connected with said output shaft through a gear train.

3. An apparatus for converting ocean wave motion into useful energy as set forth in claim 1 wherein said pressure chamber has a first cylindrical section adaptable for extending into water and a second cylindrical section smaller in cross-sectional area than the cross-sectional area of said first cylindrical section and wherein said counter-rotating turbine is mounted in said second cylindrical section and the velocity of the air in said second cylindrical section is greater than the velocity of the air in said first cylindrical section.

4. An apparatus for converting ocean wave motion into useful energy comprising,
    a pressure chamber forming a pneumatic chamber above the ocean water whereby a standing wave is maintained within the pressure chamber and transformed to a surging wave by normal wave motion thereby causing cyclic compression and suction of the air within the pressure chamber above the standing wave,
    a counter-rotating turbine transforming pneumatic suction and compression pressure of the air resulting from the wave surge into mechanical energy, said turbine comprising an output shaft mounted for rotation about a vertical axis within said pressure chamber, a first runner having a plurality of arcuate turbine blades mounted on said output shaft, said blades being designed to rotate said first runner in a given direction, a second runner having a plurality of arcuate turbine blades and mounted on a second shaft, said blades being designed to rotate said second runner in a direction opposite to the direction of rotation of said first runner and a gear train connecting said first and second shafts, first and second rows of stationarily mounted guide vanes, said first and second runners being positioned between said rows of guide vanes, and
    an aperture in said pressure chamber above said counter-rotating turbine for permitting air flow to and from said counter-rotating turbine.

5. An apparatus for converting ocean wave motion into useful energy as set forth in claim 4 wherein said output shaft and said second shaft are in axial alignment.

6. An apparatus for converting ocean wave motion into useful energy as set forth in claim 4 wherein said pressure chamber has a first cylindrical section adaptable for extending into water and a second cylindrical section smaller in cross-sectional area than the cross-sectional area of said first cylindrical section and wherein said counter-rotating turbine is mounted in said second cylindrical section and the velocity of the air in said second cylindrical section is greater than the velocity of the air in said first cylindrical section.

7. An apparatus for converting ocean wave motion into useful energy as set forth in claim 6 having a coincal hub on each end of said turbine for facilitating flow of air through said second cylindrical section.

* * * * *